(12) United States Patent
Jin et al.

(10) Patent No.: US 6,915,046 B2
(45) Date of Patent: Jul. 5, 2005

(54) OPTICAL SYSTEMS COMPRISING CURVED MEMS MIRRORS AND METHODS FOR MAKING SAME

(75) Inventors: Sungho Jin, Millington, NJ (US); Hareesh Mavoori, Piscataway, NJ (US); Roland Ryf, Aberdeen, NJ (US)

(73) Assignees: Agere Sysems, Inc., Allentown, PA (US); Lucent Technologies, Inc., Murray Hill, NJ (US)

( * ) Notice: Subject to any disclaimer, the term of this patent is extended or adjusted under 35 U.S.C. 154(b) by 489 days.

(21) Appl. No.: 10/054,499

(22) Filed: Jan. 22, 2002

(65) Prior Publication Data

US 2003/0138213 A1 Jul. 24, 2003

(51) Int. Cl.[7] .................................................. G02B 6/26
(52) U.S. Cl. .............................. 385/47; 385/16; 385/18; 359/223; 359/224; 359/872
(58) Field of Search .............................. 385/16, 18, 47; 359/578, 223, 846, 850, 224, 872

(56) References Cited

U.S. PATENT DOCUMENTS

2002/0196548 A1 * 12/2002 Kuznetsov .................. 359/578
2003/0011864 A1 * 1/2003 Flanders ..................... 359/230

* cited by examiner

*Primary Examiner*—Frank G. Font
*Assistant Examiner*—Michael P. Mooney
(74) *Attorney, Agent, or Firm*—Polster, Lieder, Woodruff & Lucchesi, L.C.

(57) ABSTRACT

A MEMs mirror device comprises a mirror layer, a frame structure, and an actuator layer. At least one mirror is movably coupled to the frame. The actuator layer includes at least one conductive path for moving the mirror. In accordance with the invention, the mirror is curved for efficiently directing and focusing reflected light. The mirror comprises a metal-coated base, and curvature can be achieved by doping selected regions of the base or by using coating/base combinations with sufficient mismatch that they be curved by differential thermal expansion. The resulting MEMs devices are advantageous for optical switching, variable attenuation and power gain equalization.

16 Claims, 12 Drawing Sheets

OPTICAL SYSTEMS COMPRISING CURVED MEMS MIRRORS AND METHODS FOR MAKING SAME

FIELD OF THE INVENTION

This invention relates to optical micro-electro-mechanical devices ("MEMs devices") and, in particular, to MEMs devices comprising movable curved mirrors.

BACKGROUND OF THE INVENTION

Optical MEMs devices are of considerable importance in optical communication systems. In one important application, a two-dimensional array of MEMs devices provides an optical cross connect between input optical paths and output optical paths. Each MEMs device in the array is a movable mirror disposed to receive an input optical signal. The mirror can be electromechanically moved to reflect the received optical input to a desired output path.

A typical MEMs mirror comprises a metal-coated base movably coupled to a surrounding frame via a gimbal. Two torsional members on opposite sides of the mirror connect the mirror to the gimbal and define the mirror's axis of rotation. The gimbal, in turn, is coupled to the surrounding silicon frame via two torsional members, defining a second axis of rotation orthogonal to that of the mirror. A light beam can therefore be steered in almost any direction.

Electromechanical actuators, such as electrodes, are disposed in a cavity underlying the mirror and the gimbal. Voltages applied to electrode actuators control the orientation of the mirror and the gimbal. Alternatively, in modified arrangements, electrical signals control magnetic, piezoelectric or thermal actuators.

The mirrors used in optical MEMs devices are typically small substrates coated with metal that is highly reflective at the wavelength of interest. MEMs mirrors typically have a maximum dimension (usually a diameter) of less than 3000 micrometers. Metal coatings such as gold, silver, rhodium, platinum, copper and aluminum can be used to reflect communications wavelengths in the range 800–1600 nm. These reflective metal films typically have thicknesses ranging from about 20 nm to about 2000 nm. The films are deposited on a movable base, usually silicon. At least one adhesion-promoting bond layer is optionally added between the reflective metal film and the base in order to prevent the reflective metal film from peeling.

A difficulty with such devices, especially where multiple reflections are needed, is loss of optical signal. The mirror surfaces are typically planar. Consequently the reflected beams are not focused. Lens arrays can be added, but their addition presents problems of loss, alignment and expense. Accordingly there is a need for MEMs devices with mirrors that are more efficient in directing and focusing light.

SUMMARY OF THE INVENTION

A MEMs mirror device comprises a mirror layer, a frame structure, and an actuator layer. At least one mirror is movably coupled to the frame. The actuator layer includes at least one conductive path for moving the mirror. In accordance with the invention, the mirror is curved for efficiently directing and focusing reflected light. The mirror comprises a metal-coated base, and curvature can be achieved by doping selected regions of the base or by using coating/base combinations with sufficient mismatch that they be curved by differential thermal expansion. The resulting MEMs devices are advantageous for optical switching, variable attenuation and power gain equalization.

BRIEF DESCRIPTION OF THE DRAWINGS

The nature, advantages and various additional features of the invention will appear more fully upon consideration of the illustrative embodiments now to be described in detail in the accompanying drawings. In the drawings.

It is to be understood that the drawings are for illustrating the concepts of the invention and, except for the graphs, are not to scale.

DETAILED DESCRIPTION

Figure 1:
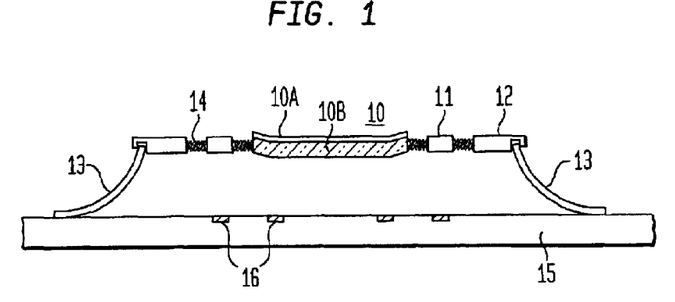
FIG. 1 illustrates a first embodiment of an optical MEMs device comprising a curved mirror.

Referring to the drawings, FIG. 1 shows a first embodiment of an optical MEMs curved mirror device. The device 9 comprises a curved mirror 10 elastically coupled, as by springs 14, to a gimbal 11 on a frame 12. The curved mirror 10 in this example is double-gimbal cantilevered, and the gimbal is attached onto the frame structure 12 by springs 14. The mirror can be tilted to any desired orientation, as for optical signal routing, via electrical voltage supplied to electrodes 16 from outside. The light-reflecting surface of curved mirror 10 comprises a metal coating 10A on a base membrane 10B. The mirror is typically of circular shape.

The mirror 10 typically has a maximum dimension (usually diameter) of less than 3000 micrometers and preferably less than 1000 micrometers. The desired radius of curvature of the mirror depends on specific applications, but it is typically smaller than 200 mm, preferably less than 80 mm, and even more preferably less than 30 mm. The curvature is advantageously close to spherical shape, although sometimes a deviation from spherical symmetry is useful in compensating optical aberrations. In general, the desired deviation from spherical is smaller than one-fourth of the average wavelength $\lambda$ of the optical beam, and preferably less than one-eighth of the wavelength. This corresponds to a deviation of less than approximately 200 nanometers for the widely used 1550 nm optical communication wavelength. The mirror 10 is curved to a desired radius of curvature as by one of the processes described herein.

The curved mirror device 9 can be fabricated on a silicon substrate 15 by micromaching processes such as multilayer deposition and selective etching. After etching, mirror assembly (10, 11, 12) can be raised above the substrate by upward bending lift arms 13 during a release process. Alternatively, the mirror assembly and the electrode-containing actuator layer can be fabricated separately and then bonded together. The metal coating 10A can be deposited by known thin film deposition methods such as vacuum evaporation, sputtering, electrochemical deposition or chemical vapor deposition. The frame 12 and mirror membrane 10B are typically polysilicon. The membrane 10B typically has a thickness in the range 0.1–40 micrometers and preferably 0.5–10 micrometers. The metal coating 10A typically has a thickness in the range 5 nanometers to 5 microns and advantageously 10 nanometers to 0.5 micrometers. The substrate 15 is typically silicon.

Figure 2:
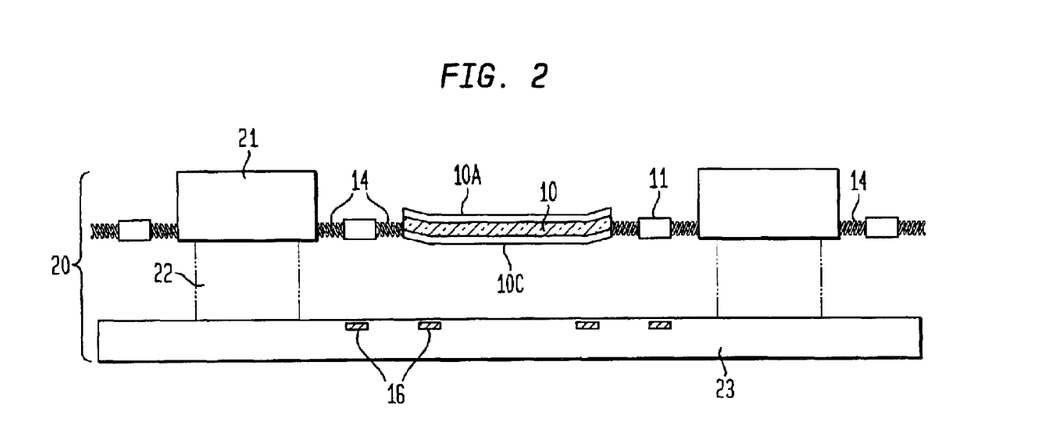
FIG. 2 shows a second embodiment of a MEMs device comprising a curved mirror.

FIG. 2 schematically illustrates an alternative embodiment of an optical MEMs curved mirror prepared using the silicon-on-insulator (SOI) fabrication process. In this embodiment the mirror 10 can be fabricated on a SOI substrate 20 comprising a first layer of silicon 21, a layer 22 of $SiO_2$ and a second layer of silicon 23. The SOI process permits convenient fabrication of the thin silicon mirrors. The buried oxide layer 22 is useful as an etch-stop barrier. Selected patterned areas of the upper layer 21 of the SOI substrate are etched, e.g. by using chemical etch, reactive-ion etch, or a combination, to form the mirror array. The gimbals 11 and the torsion springs 14 are also formed around each mirror 10. The SOI material and process are described, for example, in *Concise Encyclopedia of Semiconducting Materials and Related Technologies*, Edited by S. Mahajan and L. C. Kimmering, Pergamon Press, New York, 1992, p. 466 et seq., which is incorporated herein by reference.

Since the movable mirror 10 is typically thin and fragile, the substrate base 15, 21 which carries the mirrors and gimbals is advantageously substantially thicker in order to provide mechanical stability. The desired thickness of the SOI substrate base for MEMs mirror applications is typically in the range of 50–1000 micrometers and preferably 200–500 micrometers. The SOI material is etched so that the patterned thicker portion of the mirror-carrying substrate is facing up, while the smooth-surfaced portion is facing down toward the actuator layer 23. In this embodiment, the mirror is formed on the layer of silicon proximal the actuator layer. The mirror 10 is curved to a desired radius as by one of the processes described herein below.

Figure 3A:
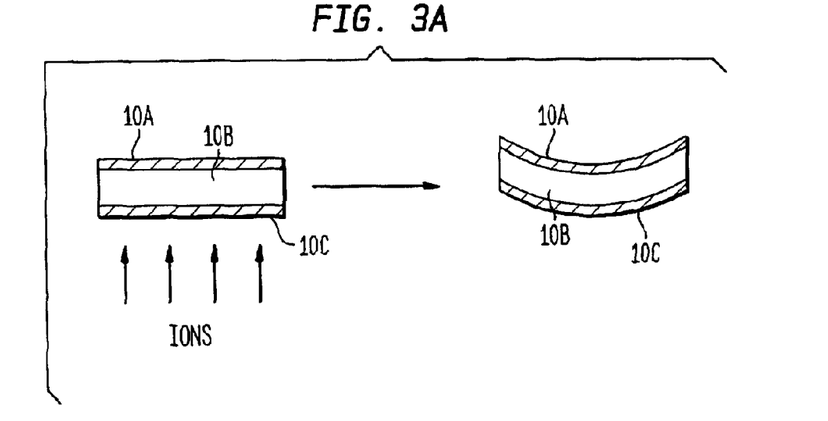
FIGS. 3A, 3B and 3C depict the fabrication of curved mirror surfaces using ion implantation.

FIG. 3A illustrates a first process for curving MEMs mirror 10. The mirror advantageously comprises a base 10B with metal coatings 10A and 10C on the top and bottom major surfaces respectively. After application of the metal coatings, the mirror 10 is subjected to ion implantation sufficient to achieve the desired curvature. Implantation produces curvature by inserting atoms that introduce compressive stress. In the example here, the implantation is from the bottom. This stretches the bottom surface, and the membrane curves up in a concave curvature. A variation would be to implant from the top with sufficiently high energy that the implanted atoms penetrate to the lower portion of the base membrane 10B. This also achieves a concave curvature.

Figure 3B:
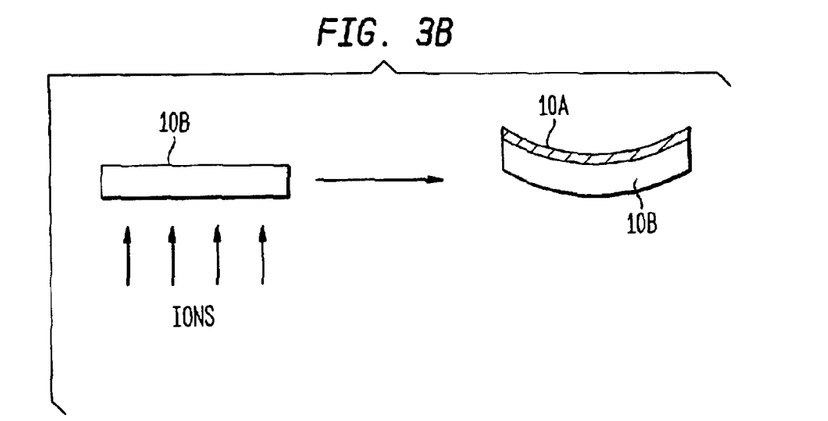

FIG. 3B shows an alternative process where the ion implantation is applied to the base 10B prior to metallization. The metallization layer (or layers) 10A can subsequently be deposited on the curved base membrane.

Figure 3C:
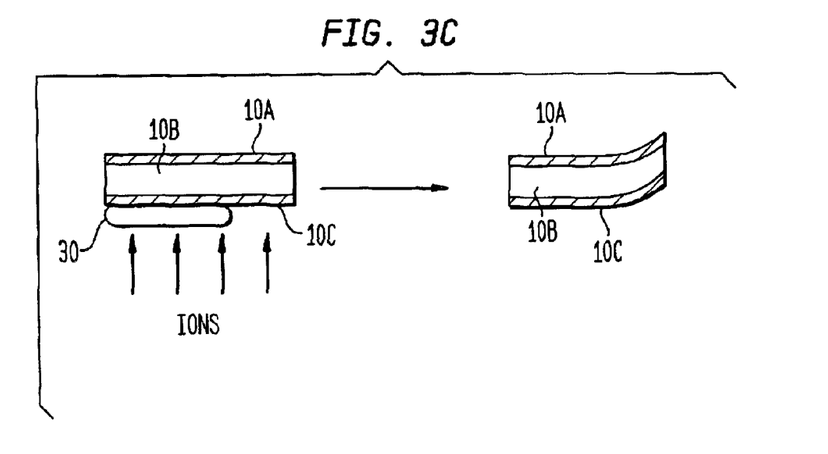

FIG. 3C illustrates another alternative especially useful in obtaining complex curvature. Here the mirror (or the implantation source) is partially masked as by mask 30 so that implantation takes place only in selected areas. The masked portion of the mirror remains flat. The unmasked portion curves. This mirror reflects a part of the incident optical signal to a certain direction and reflects the remaining optical signal to another direction, resulting in a more collimated beam. A MEMs mirror having a portion with a concave curvature and another portion with a convex curvature can similarly be obtained.

Many atomic species can be implanted to induce curvature. Advantageous species are selected from relatively light, non-reactive, non-toxic elements including H, He, B, C, N, O, F, Ne, Mg, Al, Si, P, Cl, Ar, Ca, Ti, V, Cr, Mn, Fe, Co, Ni, Cu, Zn, Y, Zr, Nb, Mo, Ru, Rh, Pd, Ag, In, Sn, and Sb. Heavier ions are less preferred as they tend to require higher energy implantation, introduce more defects in the host material, and cost more. The implantation dose required depends on the desired mirror curvature, the type of implanted ions, and the elastic stiffness of the host membrane material. The typical desired implantation dose to induce curvature is in the range of $10^{13}$–$10^{17}$ ions/cm$^2$ and preferably in the range of $5\times10^{14}$–$5\times10^{16}$ ions/cm$^2$. The desired accelerating energy of the implanted ions depends on the desired penetration depth of implantation but is typically in the range of 5–300 KeV and preferably in the range of 10–100 KeV. The desired penetration depth of implanted atoms is advantageously in the 50–500 angstrom surface region of the host membrane and preferably in the 100–200 angstrom surface region.

The use of Si ions or oxygen ions is particularly preferred as many of the MEMs devices are based on Si material and utilize $SiO_2$ as a dielectric layer. Thus implanted Si or O ions do not introduce foreign atoms which could cause reliability problems such as device shorting, impurity diffusion and contamination. With Si or O, the whole device surface can be globally implanted without local masking.

Figure 4A:
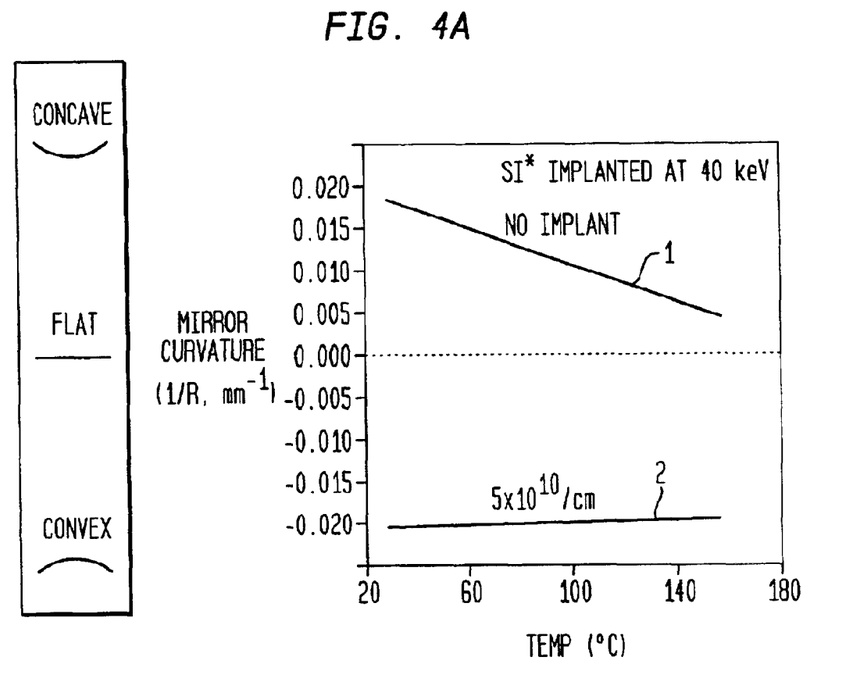
FIGS. 4A, 4B and 4C are graphical illustrations of curvature produced by ion implantation on various types of MEMs mirrors.
Figure 4B:
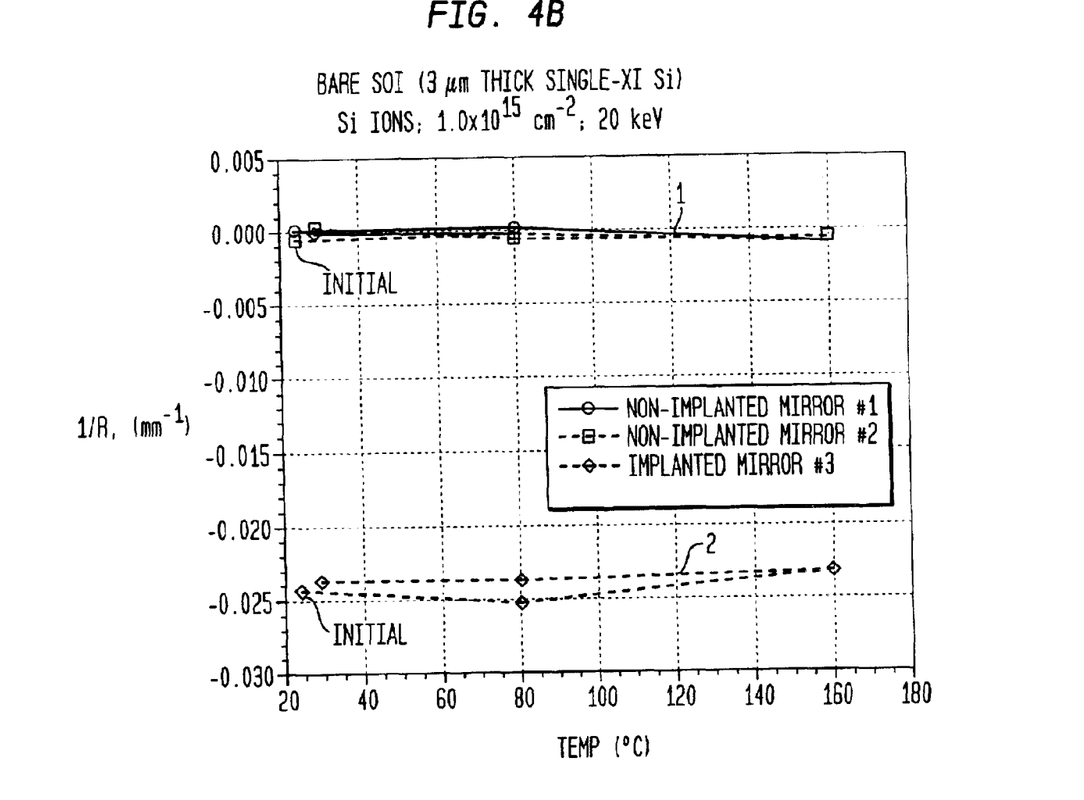
Figure 4C:
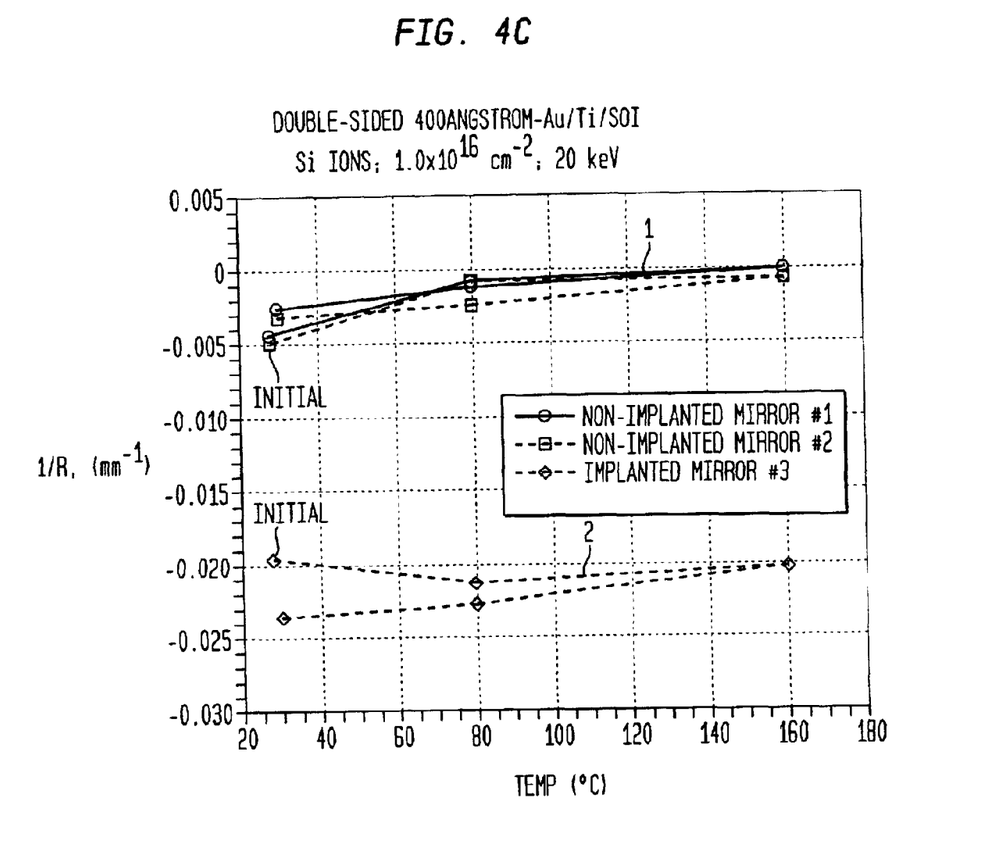

FIGS. 4A–4C are graphical illustrations useful in understanding the effect of ion implanting on the curvature of a mirror membrane. Since curvature is affected by ambient temperature, the graphs plot mirror curvature as a function of temperature. Positive values of curvature correspond to concave curvature. Negative values indicate convex curvature. Each graph includes two lines: curve 1 represents a mirror without implanting, curve 2 represents a similar mirror with implanting.

FIG. 4A shows the effect of implanting on polysilicon-based mirrors. The implantation ions are Si. The dosage was $5+10^{16}$ ions/cm$^2$ at 40 KeV. With implantation, the mirror was convex. Without implantation, the mirror was concave.

FIG. 4B illustrates implanting into single-crystal SOI mirror bases prior to metallization. The ion implantation was with Si ions at a dose of $1\times10^{15}$ ions/cm$^2$ (20 KeV). Implantation changed the curvature from flat to convex.

FIG. 4C shows the effect of implantation on coated SOI based mirrors. The SOI base had equal thickness metallizations on both top and bottom surfaces (400 angstrom Au films over 50 angstrom Ti adhesion layers). The implantation was $10^{16}$ ions/cm$^2$ of Si at 20 KeV. Implantation changed the mirror from near flat to slightly convex.

An alternative method of inducing mirror curvature is to produce a stress imbalance between the top surface and the bottom surface of the movable membrane. This can be accomplished by depositing a thermally mismatching metal coating 10A on only one side of the mirror base 10B and activating curvature by heat treatment. The coefficients of thermal expansion advantageously differ by a factor of at least two.

Figure 5A:
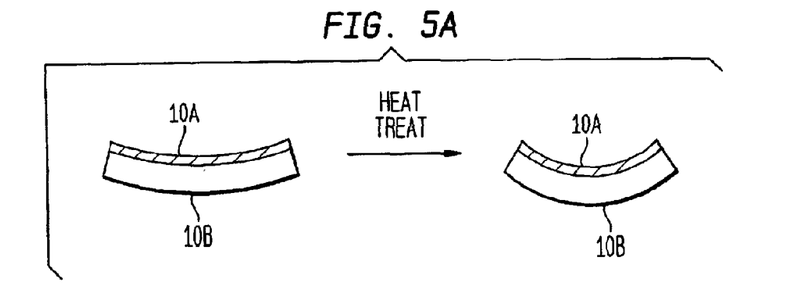
FIGS. 5A, 5B, 5C and 5D depict the fabrication of curved mirror surfaces using differential thermal expansion.
Figure 5B:
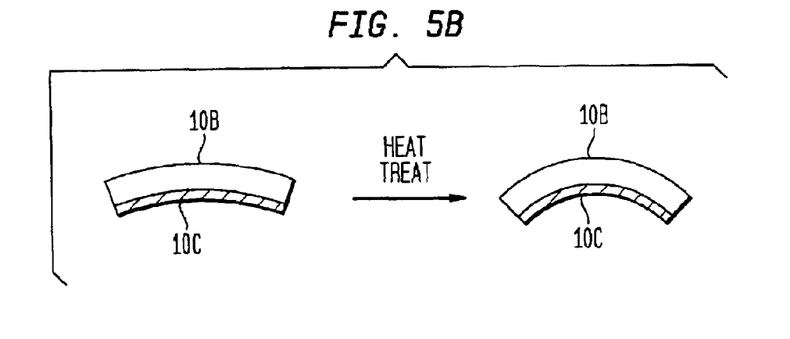

FIGS. 5A–5D schematically illustrate inducing curvature by mismatch coating followed by heat activation. Here a mirror 10B is provided with a single-sided coating of a metal having a substantial thermal mismatch with the base e.g. a Si membrane (about $4\times10^{-6}$/° C.) and Au metallization (about $14\times10^{-6}$/° C.) or Al metallization (about $23\times10^{-6}$). Metallization is followed by heating. FIG. 5A shows the effect of heat treatment on a top-side metallized MEMs membrane. The metallized side, curves slightly concave for a metallization material having higher CTE value than the host membrane materials. FIG. 5B shows the effect of heat treatment on a bottom-side metallized MEMs membrane.

The curvature increases upon heat activation. The exposure of the metallized MEMs membrane to a moderate temperature, typically in the range of about 100–600° C., and preferably 150–400° C., enhances the interface coupling for more efficient curving. A higher activation temperature produces a larger curvature. For example, one side of an SOI MEMs mirror array with each Si membrane having ~3 micrometer thickness and ~1 mm diameter was metallized with ~800 angstrom thick aluminum by electron beam evaporation. The metallized mirror was then subjected to ~160° C. heat activation to produce a mirror curvature of R~20 mm (or 1/R~0.050 $mm^{-1}$). Such a heat activation step can be separately applied for better control of the mirror curvature. Alternatively, heat activation may conveniently be combined with subsequent processing steps, for example, device packaging.

The desired thickness of the single-side metallization depends on the degree of the mirror curvature needed, the relative mechanical properties of the substrate, the metallization materials, and the extent of stresses induced by the single-side metallization. The optimal metallization thickness, can be determined empirically. It is typically in the range of 50–10000 angstroms and preferably in the range of 200–2000 angstroms.

Figure 5C:
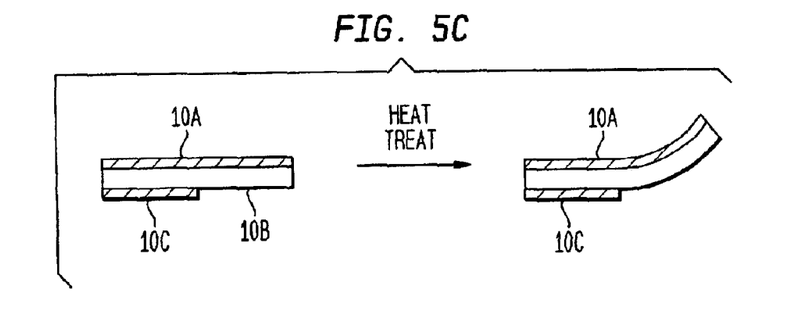

FIG. 5C illustrates production of a composite, non-symmetrical curvature. Such a composite curvature can be obtained or by partially balancing out the metallization stress using metallization on the other side of the membrane. Alternatively it can be achieved by using a metallization thickness which varies with distance from the mirror center.

Figure 5D:
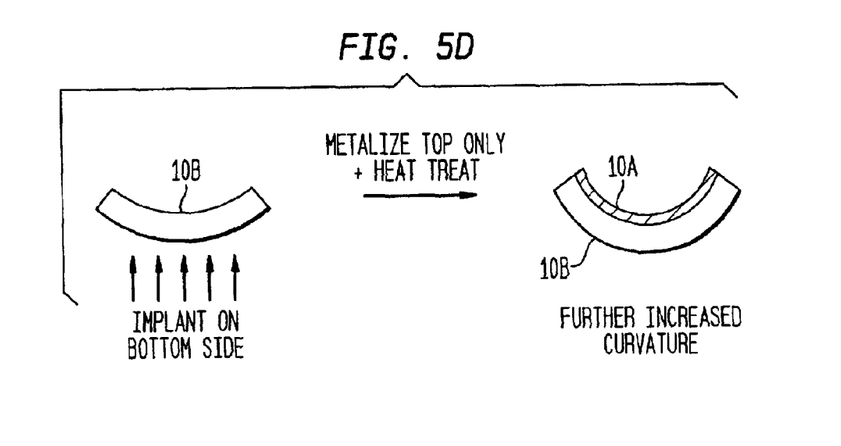

FIG. 5D shows that single-side metallization 10A and heat activation can optionally be combined with ion implantation to further increase the curvature.

Figure 6:
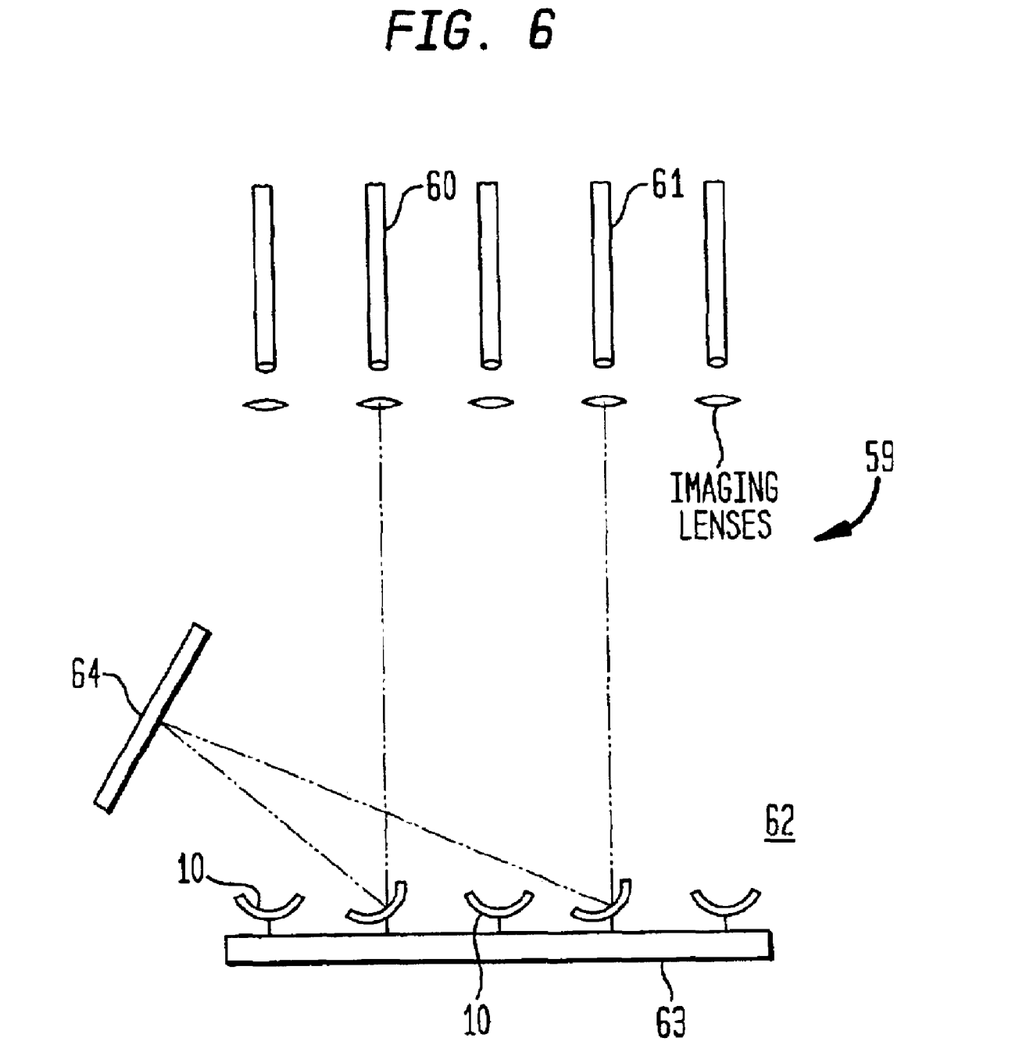
FIG. 6 illustrates an optical cross connect device comprising a curved MEMs mirror.

FIG. 6 schematically illustrates an optical cross connect device comprising a curved MEMs mirror. The cross connect device 59 comprises optical input fiber paths 60, optical output fiber paths 61 and at least one MEMs curved mirror 62 on a substrate 63. The optical signals from the input paths 60 are incident on each aligned mirror 62. Each mirror 62, with the aid of a fixed auxiliary mirror 64, is electrically controlled to reflect the incident optical signal to a respective output path 61. In alternative schemes, the input fibers and the output fibers are in separate arrays, and a pair of MEMs mirror arrays are used to perform the cross connect function. The tilting of each curved mirror is controlled by applying specific electric fields to one or more of the electrodes (not shown) beneath the mirror.

The curved MEMs mirror devices can be useful not only for channel cross-connect, but also for signal re-routing, or signal modification in optical communication systems. In the cross connect, each MEMs mirror receives an optical signal from an incoming channel and reflects it toward an intended output channel. The input signal can contain many wavelengths, or alternatively, can be demultiplexed into separated wavelength channels. The curved mirror MEMs device can also be useful for various other devices such as power gain equalizers, optical switches, wavelength-division-multiplexer (WDM) add/drop devices, optical modulators and optical signal attenuators.

Figure 7:
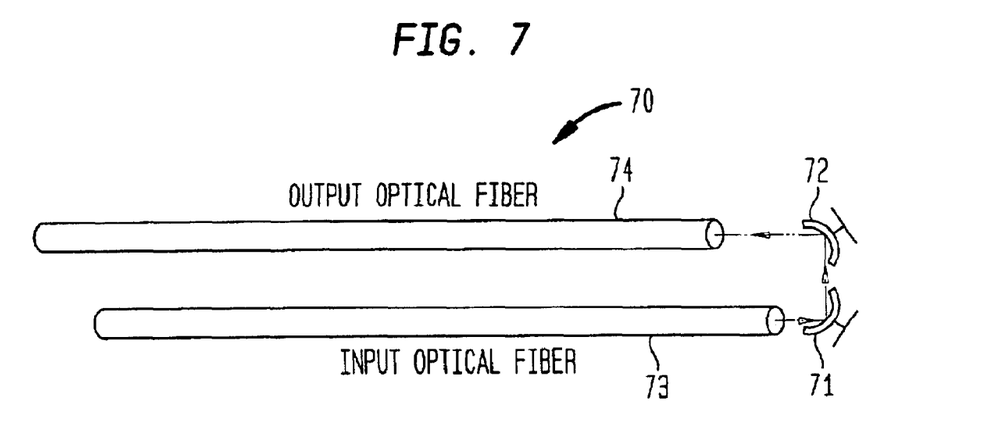
FIG. 7 shows a 180° bend device employing a curved MEMs mirror.

FIG. 7 schematically illustrates a 180 degree beam bending device 70 comprising curved MEMs mirrors 71, 72. Linear waveguides such as optical fibers 73, 74 are typically made of mechanically brittle silica ($SiO_2$) material, and can not be bent at sharp angles without fracturing. The fibers have to be bent or wound with a certain minimum radius of curvature, thus occupying relatively large device real estate. The bending device 70 effects a sharp 180 degree bending of an optical beam. Curved mirror 71 receives an input beam from input fiber 73 and reflects the beam to a second curved mirror 72. Mirror 72 reflects the mirror into output fiber 74, effecting a 180° bend. This permits the construction of compact fiber devices such as erbium-doped fibers or Bragg grating filters which need to be wound or bent with a relatively large radius.

Figure 8:
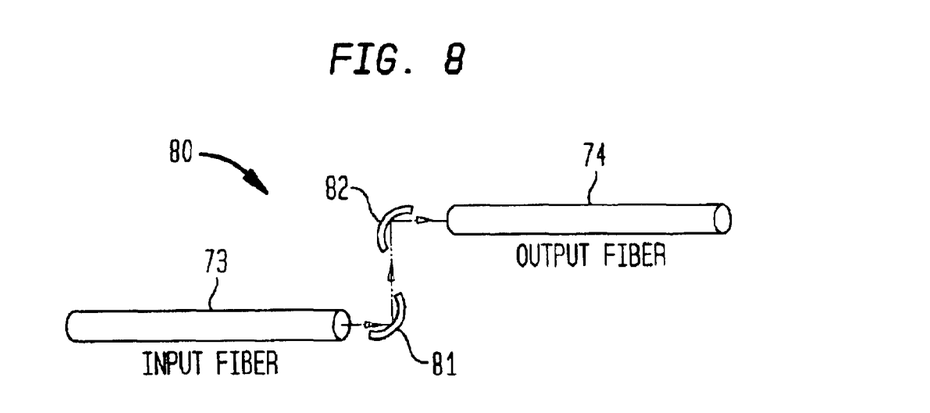
FIG. 8 illustrates an offset path shift device comprising a curved MEMs mirror.

FIG. 8 illustrates an offset path shift device 80 comprising curved mirrors 81, 82. Mirror 81 receives the input beam from fiber 73 and reflects it 90° to curved mirror 82. Mirror 82, in turn, reflects the beam another 90° onto an offset path in fiber 74 in substantially the same direction as the input beam.

Figure 9:
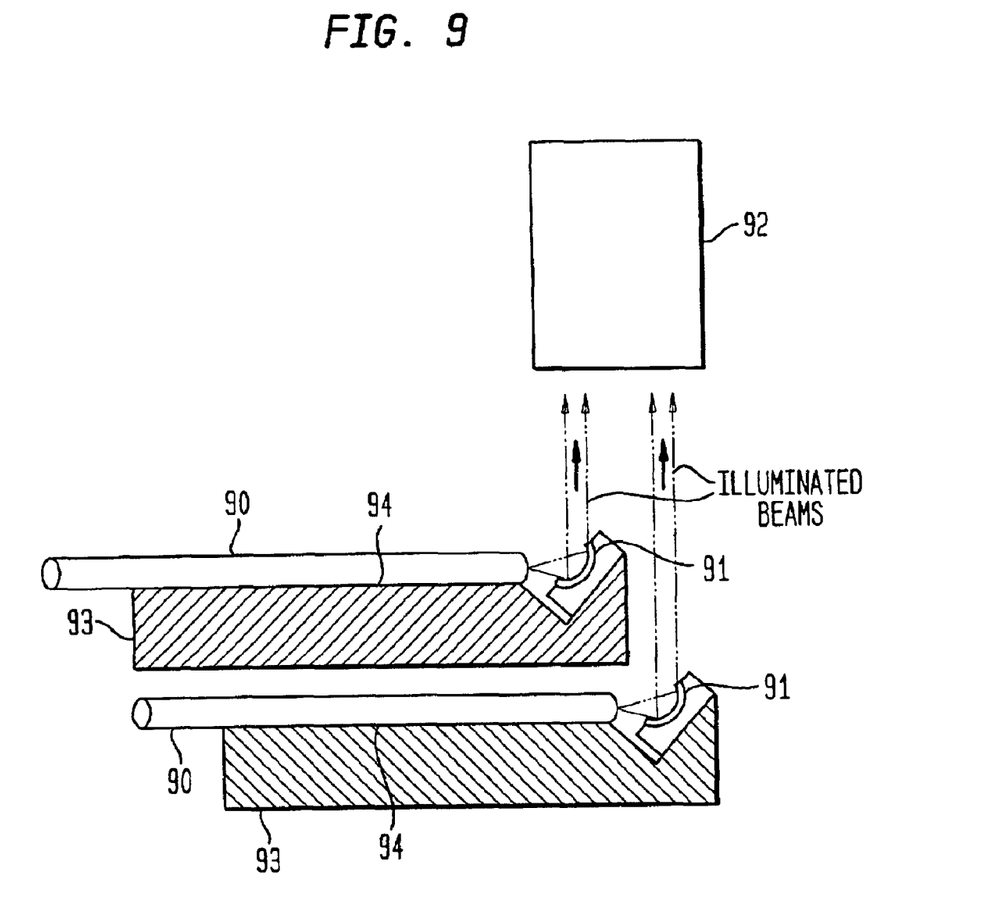
FIG. 9 shows a 90° bend device employing a curved MEMs mirror.

FIG. 9 illustrates a multiple beam bending device comprising a curved MEMs mirror 91 to send the input optical beams from an array of input fiber paths 90 to an array of output fiber paths 92. The curved are positioned at 45 degree angle relative to the input beam direction. The position of each optical fiber path 90, 92 can be mechanically secured, for example, by utilizing the silicon V-groove technique for accurate positioning fibers.

Figure 10:
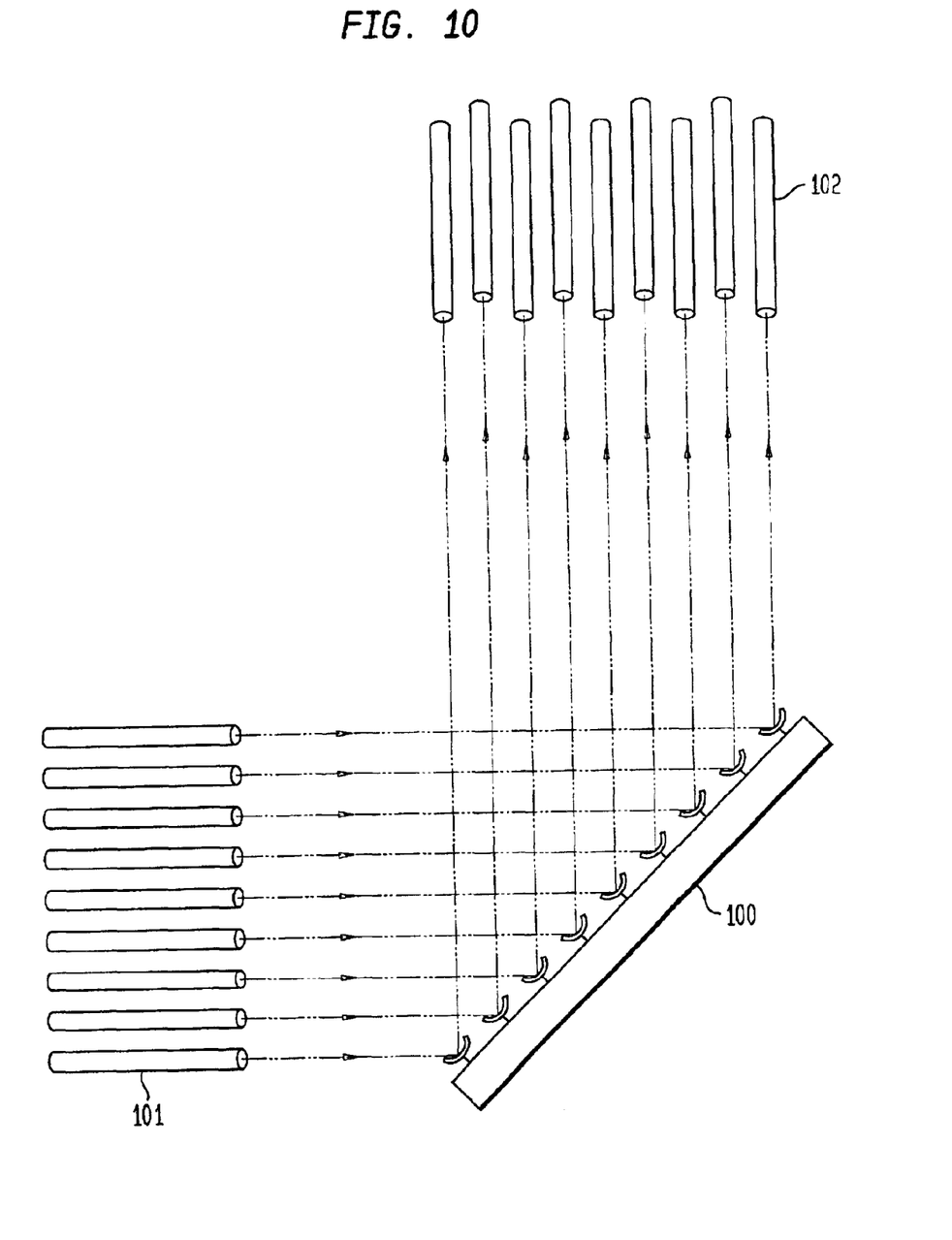
FIG. 10 illustrates a multiple-beam bending system comprising a curved MEMs mirror.

FIG. 10 shows an alternative multi-beam bending device 100 comprising curved MEMs mirrors 100 1 arranged on a planar substrate at 45 degree angles. The mirrors 100 receive input beams from an array of input fibers 101. Each mirror 100 reflects an input beam to a selected output in an array of output fibers 102.

For MEMs-based optical cross-connect systems with large number of ports, for example 1000 or 4000 input fibers and corresponding number of reflecting MEMs mirror ports and output fibers, a multi-stage beam reflection may be needed to route the optical signal beams from the input fibers to the output fibers. This is because of the limited tilt angle of the MEMs mirrors, typically at most several degrees for reliable long-term operations of the movable mirrors. The curved MEMs mirror arrangement with the light collimating capability is particularly useful for such multi-stage beam routing.

Figure 11:
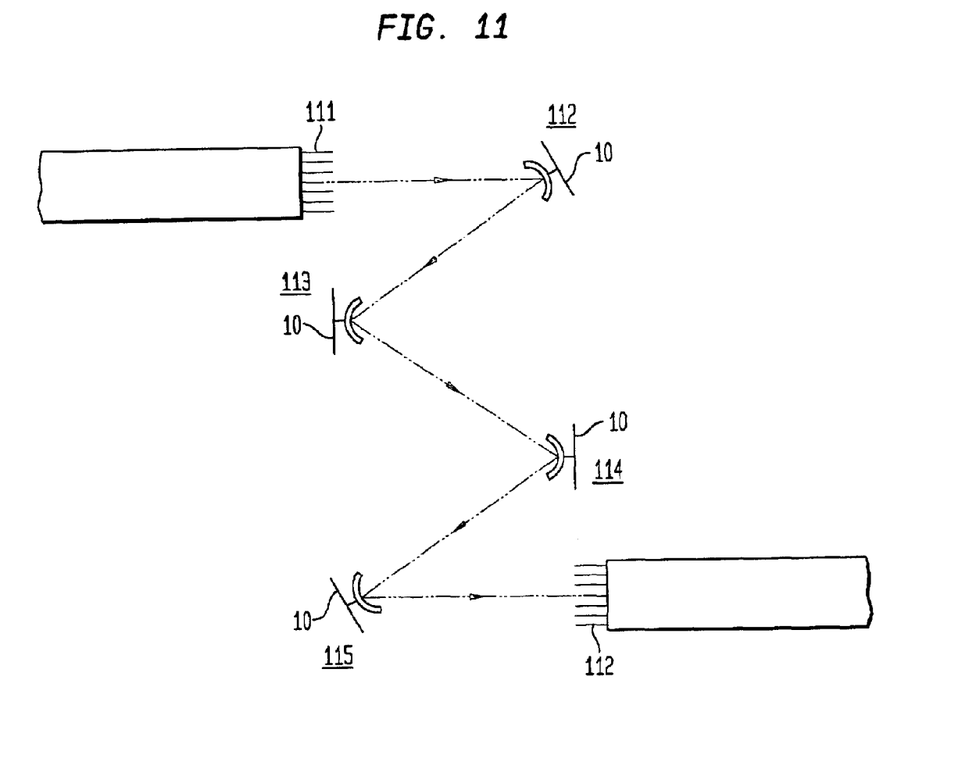
FIG. 11 depicts a signal rerouting device employing a curved MEMs mirror.

FIG. 11 illustrates a signal rerouting device 110 employing curved MEMs mirrors 10. Light beams from an array of input fiber paths 111 impinge on a first array 112 of curved MEMs mirrors 10. The beams are redirected to a succession of mirror arrays 113, 114, 115 and hence to an array of output fiber paths 116. The curved mirrors 10 minimize the use of light-focusing lenses (lens arrays) for each of the beam deflection steps. Such a multi-stage reflection approach using the curved MEMs mirrors permits a large overall angle beam deflection and enables a large-port-number cross-connect systems without straining the mirrors to tilt excessively and thus reducing fatigue or fracture of spring members of the movable MEMs mirror structure.

Figure 12A:
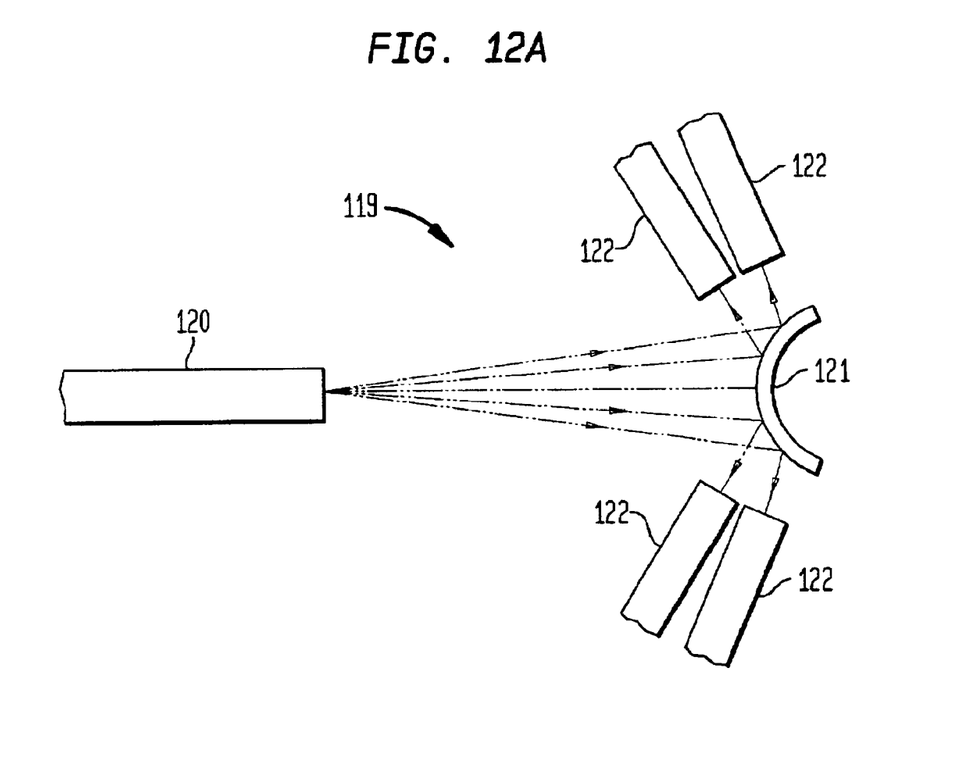
FIGS. 12A, 12B and 12C show optical beam splitters or combiners comprising curved MEMs mirrors.
Figure 12B:
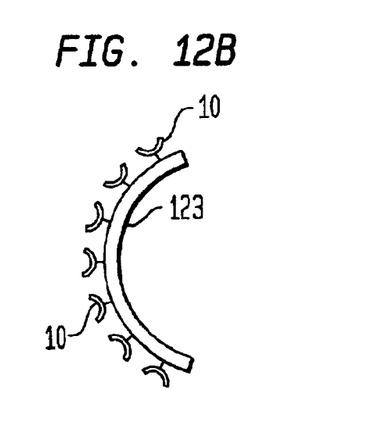
Figure 12C:
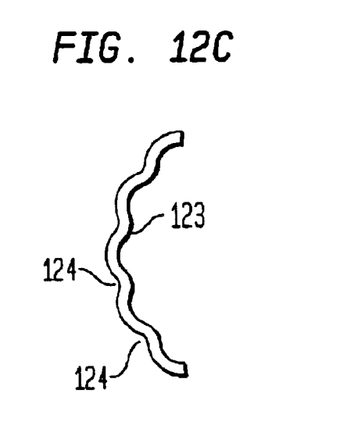

The curved MEMs mirror devices according to the invention can also useful as an optical beam splitter or a beam combiner 119, as illustrated schematically in FIG. 12. The optical beam signal coming out of the input fiber path 120 is reflected from the convex-curved mirror surface 121 (desirably with a high quality light-reflecting coating such as Al or Au) toward various directions. An array of output fiber paths 122 appropriately positioned collects the split beam signals. If the direction of the beam travel is reversed, the device of FIG. 12 can serve as a beam combiner since the signals from various paths of array 122 merge into one path 120. In order to improve the focusing or collimating of the beam on reflection off the convex surface 121. Alternatively, further improved embodiments of FIG. 12(b) can be utilized. Here, the desired local regions on the convex surface 123 are made to have concave curvature by either providing an array of concave MEMs mirrors 10. In FIG. 12C, curved mirrors are provided by inducing local compressively stressed regions 124 using ion implantation or one-sided metallization spots.

The inventive methods and structures can also be applied to devices which are not MEMs type devices. It should be understood that the above-described embodiments are illustrative of only a few of the many possible specific embodiments which may represent applications of the present invention. Numerous and varied other arrangements can be made by those skilled in the art without departing from the spirit and scope of the invention.

Although the present invention has been described in detail, those skilled in the art should understand that they can make various changes, substitutions and alterations herein without departing from the spirit and scope of the invention in its broadest form.

What is claimed is:

1. An optical system comprising an input optical fiber, an output optical fiber and a curved micro-electro-mechanical (MEMs) mirror Comprising:

a mirror layer for receiving light from the input fiber comprising a frame and at least one curved mirror comprising a metal-coated substrate movably coupled to the frame, the curved mirror having a maximum dimension less than 3000 micrometers and a radius of curvature less than 200 millimeters for reflecting and focusing light from the input fiber;

and an actuation layer disposed adjacent the mirror layer comprising at least one actuator coupled to the curved mirror for controllably tilting the curved mirror to direct the reflected light onto the optical output fiber.

2. The optical system of claim 1 wherein the actuator comprises an electromechanical actuator.

3. The optical system of claim 1 wherein the maximum dimension is less than 1000 micrometers and the radius of curvature is less than 80 millimeters.

4. An optical system comprising a curved mircro-electro-mechanical (MEMs) mirror comprising:

a mirror layer comprising a frame and at least one curved mirror movably coupled to the frame, the curved mirror having a maximum dimension less than 3000 micrometers and a radius of curvature less than 200 millimeters, and an actuation layer disposed adjacent the mirror layer comprising at least one activator coupled to the curved mirror for controllably tilting the curved mirror, wherein the mirror layer comprises a metal-coated substrate, the substrate having a thickness in the range 0.1–40 micrometers and the metal coating having a thickness in the range 5 nanometers to 5 micrometers.

5. The optical system of claim 4 wherein the metal coating comprises a metal selected from the group consisting of gold, silver, rhodium, platinum, copper and aluminum.

6. The optical system of claim 4 wherein the substrate comprises silicon.

7. An optical system comprising a curved micro-electromechanical (MEMs) mirror comprising:

a mirror layer comprising a frame and at least one mirror movably coupled to the frame, the mirror having a maximum dimension less than 3000 micrometers and a radius of curvature less than 200 millimeters;

an actuation layer disposed adjacent the mirror layer comprising at least one actuator coupled to the mirror for controllably moving the mirror;

wherein the mirror layer comprises a metal-coated substrate having a pair of major surfaces, a thickness an the range 0.1–40 micrometers, and dopants implanted in the region of one major surface in sufficient concentration to curve the mirror to a radius of curvature less than 200 millimeters;

and wherein the metal coating has a thickness in the range 5 nanometers to 5 micrometers.

8. The optical system of claim 4 wherein the metal coating and the substrate have coefficients of thermal expansion that differ by more than a factor of 2.

9. A method of making a device having a curved MEMs mirror comprising the steps of:

providing a device having a mirror substrate with a maximum dimension less than 3000 micrometers, and implanting into the substrate in a surface region thereof, a sufficient concentration of dopants to curve at least a portion of the substrate to a radius of curvature less than 200 millimeters.

10. The method of claim 9 wherein the substrate is curved to a radius of curvature less than 200 millimeters.

11. The method of claim 9 wherein the implanting is by ion implanting at a dosage in the range $10^{13}$–$10^{17}$ ions/cm$^3$.

12. A method of making a device having a curved MEMs mirror comprising the steps of:

providing a device having a mirror substrate with a first thickness maximum dimension of less than 40 micrometers and a first coefficient of thermal expansion;

coating the substrate with a coating of metal having a second thickness and a second coefficient of the thermal expansion;

and heat treating the coated substrate to a temperature in the range 100–600° C., the first and second coefficients and thicknesses and the heat treating temperature chosen to curve at least a portion of the coated substrate to a radius of curvature less than 200 millimeters.

13. The method of claim 12 wherein the substrate is curved to a radius of curvature less than 200 millimeters.

14. An optical system comprising:

a first optical fiber;

a second optical fiber; and a curved micro-electro-mechanical (MEMs) mirror to direct light from the first optical fiber to the second optical fiber, the MEMs mirror comprising a frame and at least one mirror movably coupled to the frame, an actuation layer disposed adjacent the mirror layer comprising at least one actuator coupled to the mirror for controllably moving the mirror, the mirror having a maximum dimension of less than 3000 micrometers and a radius of curvature less than 200 millimeters.

15. The system of claim 1 wherein the output location comprises an optical fiber.

16. The system of claim 1 wherein the output location comprises a second curved mirror.

* * * * *